(No Model.)
L. DUNCAN.
METHOD OF MAKING SECONDARY BATTERY PLATES.
No. 394,472. Patented Dec. 11, 1888.
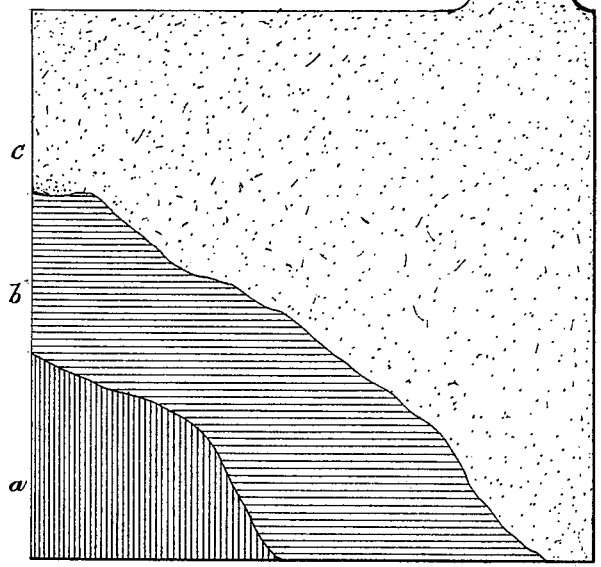

UNITED STATES PATENT OFFICE.

LOUIS DUNCAN, OF BALTIMORE, MARYLAND.

METHOD OF MAKING SECONDARY-BATTERY PLATES.

SPECIFICATION forming part of Letters Patent No. 394,472, dated December 11, 1888.

Application filed May 12, 1888. Serial No. 273,693. (No model.)

*To all whom it may concern:*

Be it known that I, LOUIS DUNCAN, of Baltimore, in the State of Maryland, have invented a certain new and useful Improvement in the Manufacture of Secondary - Battery Plates, of which the following is a specification.

My invention relates to the method of making secondary-battery plates described but not claimed in my application, No. 273,692, of even date herewith.

My object is to produce in a simple and effective manner a plate whose core or support has an impervious covering, whereby local action is prevented.

In carrying my invention into effect I take a plate of lead or other suitable metal or alloy, which may have a plane surface, or may be provided with cells or depressions, and place the same as the anode in an electrolytic bath composed of an alkaline solution of a salt of lead, the cathode being preferably a lead plate. I employ a very weak current in the bath and continue the operation for some time, and I also preferably keep up an agitation of the solution during the electrolytic process. This may be done by mechanically shaking the bath or the plates, by stirring the liquid by means of an air-blast, by keeping up a circulation of the liquid, or in any other suitable and convenient manner. I prefer that the solution of the cell shall be one of litharge in caustic soda or potash. The result of this process is the formation upon the metal plate of a hard dense even coating, which may be made as thin as desired, of an oxide of lead, which is impervious to the electrolytes used in secondary batteries. I apply the active material, preferably loose or porous peroxide of lead, externally to this coating. I may do this either by an electrolytic or by a mechanical process. The impervious coating prevents local action between the core and the active material, as is fully explained in the application before referred to.

It is evident that any desired number of plates may be placed in the bath and operated upon at the same time.

In the accompanying drawings, Figure 1 is a front elevation, and Fig. 2 a cross-section, of a plate made in accordance with the herein-described method.

In Fig. 1 the layers of material are successively broken away to show those beneath. The plate $a$ has first the thin impervious coating, $b$, on both sides, and external to this are the thicker layers, $c$, of active material.

What I claim is—

1. The herein - described improvement in the method of making secondary-battery elements, consisting in electrically depositing upon the core or supporting-plate an impervious coating of material and then applying the active material external thereto.

2. The herein - described improvement in the method of making secondary-battery elements, consisting in electrically depositing upon the core or supporting-plate a hard dense coating of an oxide of lead and then applying the active material external thereto.

3. The herein - described improvement in the method of making secondary-battery elements, consisting in electrically depositing upon the core or supporting-plate from an alkaline solution of a salt of lead and at the same time agitating the solution.

4. The herein - described improvement in the method of making secondary-battery elements, consisting in electrically depositing upon the core or supporting-plate by means of a very weak current an alkaline solution of a salt of lead and at the same time agitating the solution.

This specification signed and witnessed this 9th day of May, 1888.

LOUIS DUNCAN.

Witnesses:
W. SCOTT GOSNELL,
P. H. C. STITCHER, Jr.